/ 12/83    OR    4,393,303

United States Patent [19]
Spinhirne

[11] 4,393,303
[45] Jul. 12, 1983

[54] INTRACAVITY PHASE FRONT AND POWER CONTROL

[75] Inventor: James M. Spinhirne, Jupiter, Fla.

[73] Assignee: United Technologies Corporation, Hartford, Conn.

[21] Appl. No.: 259,875

[22] Filed: May 4, 1981

[51] Int. Cl.³ .............................................. G01J 1/20
[52] U.S. Cl. ...................................... 250/201; 372/95
[58] Field of Search .............................. 250/201, 204; 372/29–32, 95

[56] References Cited
U.S. PATENT DOCUMENTS 4,091,274  5/1978  Angelbeck et al. ................. 250/201
4,249,140  2/1981  Frieberg ................................ 372/95

Primary Examiner—David C. Nelms
Attorney, Agent, or Firm—Eric W. Petraske

[57] ABSTRACT

An adaptive optic control system employs a single intracavity deformable mirror having a separately controlled multi-pass region and single-pass region to separately control the output power and wave front, respectively.

4 Claims, 3 Drawing Figures

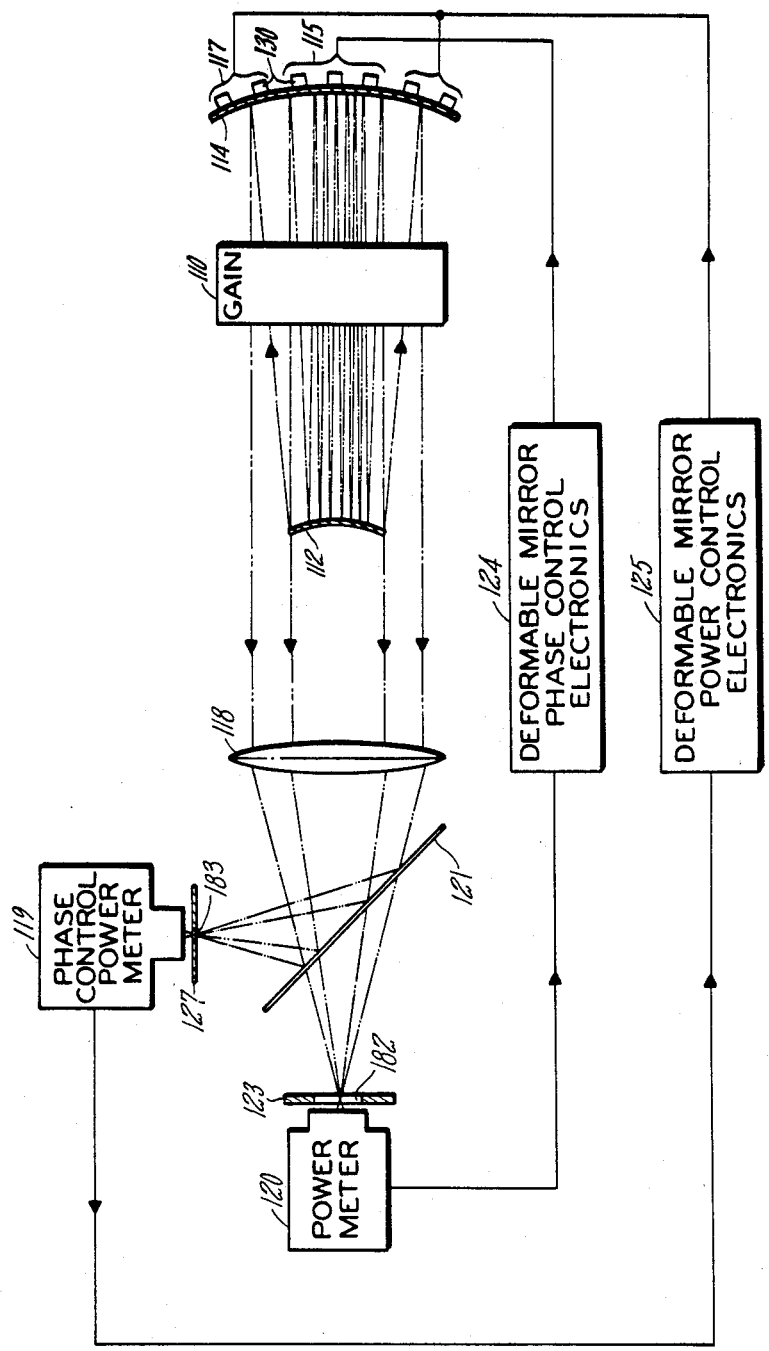

INTRACAVITY PHASE FRONT AND POWER CONTROL

DESCRIPTION

1. Technical Field

The field of the invention is the use of an adaptive optical system to control simultaneously the phase front and the power of a beam from an unstable optical resonator.

2. Background Art

U.S. Pat. No. 4,091,274 issued to Angelbeck et al discloses an adaptive optical control system for correcting errors in the phase front of a high power laser output beam. The mirror employed is located outside the optical cavity. The article "Adaptive Laser Resonator" by Freeman et al, appearing in Optics Letters, Vol. 2, page 61, 1978, discloses an adaptive optical system for controlling the phase front of a high power laser, in which the deformable mirror employed for control is located within the optical cavity.

DISCLOSURE OF INVENTION

The invention relates to an adaptive optical laser system, in which a deformable mirror is employed which has two areas, one area in which the circulating light strikes the mirror only once and another area in which the light strikes the mirror several times. These areas are separately controlled to improve both the phase front and the power of the output beam.

BRIEF DESCRIPTION OF DRAWINGS

FIG. 2 illustrates a system constructed according to the invention; and

BEST MODE FOR CARRYING OUT THE INVENTION

Figure 1:
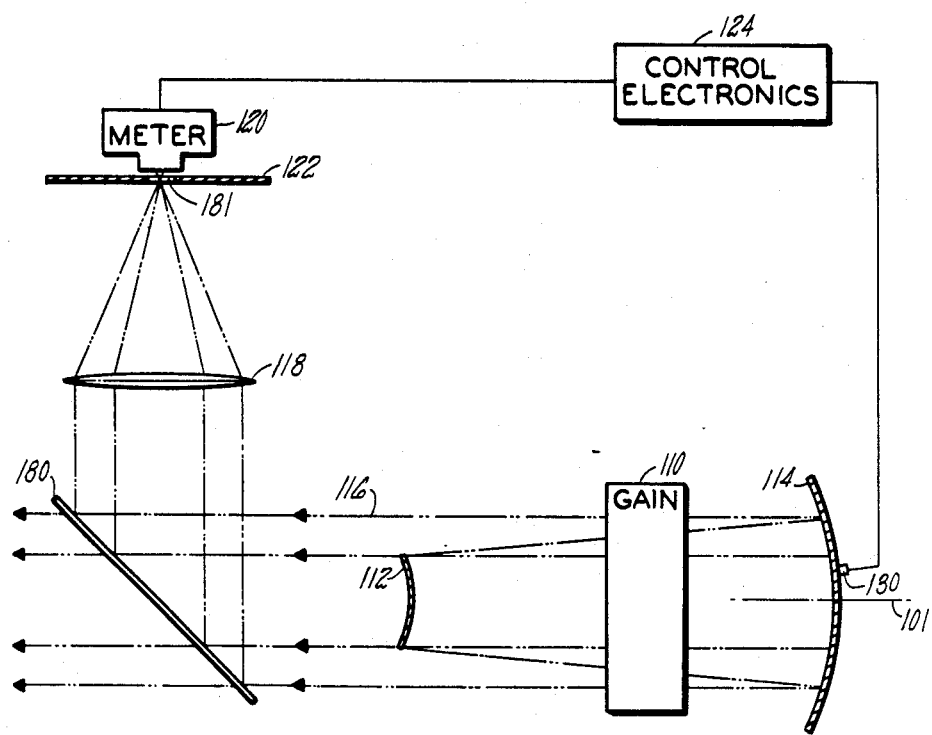
FIG. 1 illustrates an adaptive optical system employing a single detector to control a deformable mirror.

FIG. 1 illustrates a prior art adaptive optical control system, in which gain medium 110 bounded by mirror 112 and deformable mirror 114 form an unstable optical resonator producing an output beam 116 which is sampled by beam splitter 180, the sampled beam being focused by lens or mirror 118 through aperture 181 in plate 122. The radiation falling through aperture 181 is measured in power meter 120. Control electronics 124 respond to the level in meter 120 to control a plurality of piezoelectric actuators 130, one of which is shown in the drawing, on deformable mirror 114.

This system employs conventional multifrequency dither techniques, in which each of actuators 130 is vibrated at a different frequency and electronics 124 separate the signals in meter 120 of those different frequencies, and adjust the voltages applied to actuators 130 in order to optimize the reading from meter 120. In this case, the fact that deformable mirror 114 is located within the optical cavity means that changes in the voltage on actuators 130, i.e. changes in the shape of deformable mirror 114, will affect both the output power of the beam and its optical quality. With only one meter, and only one aperture, the system will not be able to optimize both the output power and the output optical quality. It is known that such an adaptive control system produces the best optical quality when aperture 181 is smaller than the Airy disk of the output beam, because the system will not be able to detect imperfections caused by higher order modes if the aperture is large.

It is also known, however, that power may be extracted from the gain medium most efficiently when higher order modes having a variety of intensity distributions are included in the beam. Such higher modes have wave fronts that differ from the front of the lowest order mode, of course, and therefore also have focal spot sizes that differ from that of the lowest order mode. The use of an aperture considerably larger than the Airy disk will permit the control system to respond to these higher modes and thus will permit the adjustment of the system to support a combination of modes that will extract power from the gain medium most efficiently. The use of a single aperture will necessarily result in a compromise between the requirements for phase front control and for power control.

The foregoing problems are solved in the embodiment of the invention illustrated in FIG. 2, in which mirror 114 has two separate regions, a central multipass region 115 and an outer single-pass region 117, which separately respond to control electronics 124 and 125 respectively. The output beam is split by beam splitter 121, a portion going through large aperture 182 in plate 123 then to power meter 120. Power meter 120 feeds into power control electronics unit 124 which in turn controls central portion 115 of deformable mirror 114. It is in this multi-pass region, in which reflected light strikes region 115 several times before escaping, that the output mode structure of the gain medium in the cavity is established. Thus this region essentially controls the efficiency in which power is extracted from the gain medium by controlling the mode structure and thus controls the output power of the output beam. Use of a large aperture 182 also reduces the $2\pi n$ ambiguity problem for control of the inner region of the resonator. For example, if the defect in the phase front is a tilt, with a small aperture the system may lock onto the first maximum in the output beam diffraction pattern, rather than onto the central peak. If the aperture is large, the meter can respond to both the peak and the first diffraction pattern and will then drive to a configuration in which the phase front is uniform.

A second portion of the output beam passes through aperture 183, smaller than the Airy disk of the output beam, and into phase control power meter 119. Meter 119 feeds into control electronics 125 controlling the outer portion 117 of mirror 114. Portion 117 is the single-pass region, in which the light strikes mirror 114 only once as it escapes from the cavity. This region of mirror 114 primarily affects the phase front of the output beam, but not the output power, so that adjustments to this region of mirror 114 will affect only the optical quality of the output beam. Region 117 of mirror 114 may be used to compensate for optical aberrations within the mirrors, within the gain medium, or in the atmosphere outside the laser. Such simultaneous correction of output power and output phase front was previously possible only with the use of two deformable mirrors, one inside the cavity to control the output power and one outside the cavity to control the phase front.

The actual control may be effected by means of a conventional multifrequency dither system, well known to those skilled in the art, or by means of a more sophisticated system, in which meter 119 is replaced by a wave front sensor. In the dither system, meter 119 is a power meter responsive to the power passing through aperture 183 and control electronics 125 include conventional circuitry for separating the signals from each of actuators 130 in region 117 and applying conventional servo techniques to maximize the power passing through aperture 183, and thereby produce optimal cavity.

If desired, meter 119 and plate 127 could be replaced by a Hartmann sensor or by any other device responsive to the wave front quality of the output beam. Control electronics 125 would also be replaced by circuitry to compute the deviation of the output beam from a reference beam or from calibration values previously stored and to manipulate region 117 in order to restore the wave front of the output beam to the nominal configuration. Advantages of this more complex measurement system are the elimination of the $2\pi n$ phase ambiguities and/or the selection of output phase to a predetermined profile for correction of extracavity aberrations.

Figure 3:
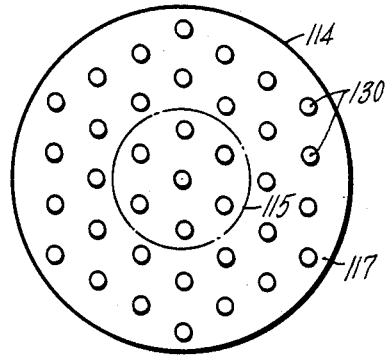
FIG. 3 illustrates a deformable mirror having two separate control areas.

FIG. 3 shows a back view of mirror 114, showing central region 115 and outer region 117. The number of actuators 130 is not critical and will depend upon the size of the beam and the quality of correction desired. It will be evident to those skilled in the art that the beam must be large enough compared with the size of the piezoelectric actuator array, so that a sufficient number of actuators will be located in each region to adjust the mirror surface as desired. It will also be evident to those skilled in the art that the invention is not confined to a symmetric beam, in which the two regions are concentric rings, but will apply to any beam shape in which there are two separate regions, one multi-pass and the other single-pass.

I claim:

1. An adaptive optical resonator comprising:
   an optical gain medium;
   means for exciting optical radiation within said gain medium;
   reflective means, including a deformable mirror, disposed about said optical gain medium to form an unstable optical resonator for said radiation; and
   feedback means, responsive to a portion of said outcoupled radiation, for controlling said deformable mirror, characterized in that:
   said deformable mirror has a first region reflecting radiation within said resonator and a second region reflecting radiation out of said resonator;
   said feedback means includes means for focusing a portion of said outcoupled radiation to a plurality of feedback focal points, a first detector responsive to a first fraction of said portion of said outcoupled radiation falling within a predetermined aperture centered on one of said feedback focal points and connected to means for controlling said first region to maximize the power of said first fraction of radiation impinging on said first detector, and a second detector responsive to a second fraction of that portion of said outcoupled radiation directed at another of said feedback focal points and connected to means for controlling said second region of said deformable mirror to adjust the wave front of said outcoupled radiation.

2. A resonator according to claim 1, in which said second fraction is that fraction of said radiation incident on said another feedback focal point that passes through a second aperture smaller than the Airy disk of said output beam, centered on said another feedback focal point and said second detector responds to the power of radiation passing through said second aperture.

3. A resonator according to claim 1, in which said second detector is a wave front detector.

4. A resonator according to either of claims 1 or 2, in which said predetermined aperture is greater than the Airy disk of said output beam.